US012105280B2

(12) United States Patent
Petljanski et al.

(10) Patent No.: US 12,105,280 B2
(45) Date of Patent: Oct. 1, 2024

(54) METHOD AND DEVICE FOR EYE TRACKING USING EVENT CAMERA DATA

(71) Applicant: Apple Inc., Cupertino, CA (US)

(72) Inventors: Branko Petljanski, San Jose, CA (US); Raffi A. Bedikian, Mountain View, CA (US); Daniel Kurz, Sunnyvale, CA (US); Thomas Gebauer, Munich (DE); Li Jia, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/961,963

(22) Filed: Oct. 7, 2022

(65) Prior Publication Data
US 2023/0314798 A1 Oct. 5, 2023

Related U.S. Application Data

(63) Continuation of application No. 17/481,272, filed on Sep. 21, 2021, now Pat. No. 11,474,348, which is a (Continued)

(51) Int. Cl.
G02B 27/00 (2006.01)
G02B 27/01 (2006.01)
G06F 3/01 (2006.01)

(52) U.S. Cl.
CPC ..... G02B 27/0093 (2013.01); G02B 27/0101 (2013.01); G02B 27/0172 (2013.01); (Continued)

(58) Field of Classification Search
CPC ...... G02B 2027/0138; G02B 2027/014; G02B 2027/0187; G02B 27/0093; (Continued)

(56) References Cited

U.S. PATENT DOCUMENTS 5,280,313 A 1/1994 Kohayakawa
8,077,914 B1 12/2011 Kaplan
(Continued)

FOREIGN PATENT DOCUMENTS

CN 104094280 A 10/2014
CN 105769117 A 7/2016
(Continued)

OTHER PUBLICATIONS

International Search Report and Written Opinion, International Application No. PCT/US2018/053143, mailed Dec. 14, 2018, pp. 1-10.
(Continued)

*Primary Examiner* — Dmitriy Bolotin
(74) *Attorney, Agent, or Firm* — Fernando & Partners, LLP

(57) ABSTRACT

In one implementation, a method includes emitting light with modulating intensity from a plurality of light sources towards an eye of a user. The method includes receiving light intensity data indicative of an intensity of the plurality of glints reflected by the eye of the user in the form of a plurality of glints. The method includes determining an eye tracking characteristic of the user based on the light intensity data. In one implementation, a method includes generating, using an event camera comprising a plurality of light sensors at a plurality of respective locations, a plurality of event messages, each of the plurality of event messages being generated in response to a particular light sensor detecting a change in intensity of light and indicating a particular location of the particular light sensor. The method includes determining an eye tracking characteristic of a user based on the plurality of event messages.

24 Claims, 12 Drawing Sheets

Related U.S. Application Data continuation of application No. 16/651,228, filed as application No. PCT/US2018/053143 on Sep. 27, 2018, now Pat. No. 11,150,469.

(60) Provisional application No. 62/564,875, filed on Sep. 28, 2017.

(52) U.S. Cl.
CPC ......... *G02B 27/0179* (2013.01); *G06F 3/013* (2013.01); *G02B 2027/0138* (2013.01); *G02B 2027/014* (2013.01); *G02B 2027/0187* (2013.01)

(58) Field of Classification Search
CPC .............. G02B 27/0101; G02B 27/017; G02B 27/0172; G02B 27/0179; G06F 3/013; G06F 3/0304; G06F 3/147; G09G 3/003
See application file for complete search history.

(56) References Cited

U.S. PATENT DOCUMENTS

| | | | |
|---|---|---|---|
| 8,971,570 | B1 | 3/2015 | Raffle et al. |
| 11,150,469 | B2 | 10/2021 | Petljanski et al. |
| 11,474,348 | B2 * | 10/2022 | Petljanski ............... G06F 3/147 |
| 2003/0098954 | A1 | 5/2003 | Amir et al. |
| 2005/0175218 | A1 | 8/2005 | Vertegaal et al. |
| 2006/0256133 | A1 | 11/2006 | Rosenberg |
| 2009/0174864 | A1 | 7/2009 | Hutchin |
| 2013/0114850 | A1 | 5/2013 | Publicover et al. |
| 2013/0135204 | A1 | 5/2013 | Raffle et al. |
| 2014/0002349 | A1 | 1/2014 | Hansen |
| 2014/0232638 | A1 | 8/2014 | Choi et al. |
| 2015/0070273 | A1 * | 3/2015 | He ........................ G06F 3/013 348/78 |
| 2015/0098620 | A1 | 4/2015 | Wu et al. |
| 2015/0193920 | A1 | 7/2015 | Knee et al. |
| 2015/0199006 | A1 | 7/2015 | He et al. |
| 2015/0296135 | A1 | 10/2015 | Wacquant et al. |
| 2016/0249800 | A1 | 9/2016 | Horesh et al. |
| 2016/0370591 | A1 | 12/2016 | Wilson et al. |
| 2017/0078645 | A1 | 3/2017 | Aurigema |
| 2017/0185145 | A1 | 6/2017 | Horesh |
| 2019/0179205 | A1 | 6/2019 | Shi et al. |

FOREIGN PATENT DOCUMENTS

| | | |
|---|---|---|
| CN | 105814584 A | 7/2016 |
| CN | 106062665 A | 10/2016 |
| EP | 1691670 A1 | 8/2006 |
| EP | 2776978 A1 | 9/2014 |
| JP | 2002007053 A | 1/2002 |
| JP | 2009512009 A | 3/2009 |
| WO | 2005/046465 A1 | 5/2005 |
| WO | 2007043954 A1 | 4/2007 |
| WO | 2013/070788 A1 | 5/2013 |
| WO | 2016103525 A1 | 6/2016 |

OTHER PUBLICATIONS

Japanese Notice of Reasons for Refusal dated Apr. 15, 2021, Japanese Patent Application No. 2020-517942, pp. 1-6 (Includes Machine-Generated English Translation).

Chinese Office Action dated Sep. 18, 2021, Chinese Application No. 201880062973.4, pp. 1-22 (Including English Translation).

Chinese Notification to Grant dated Apr. 8, 2022, Chinese Application No. 201880062973.4, 6 pages.

Extended European Search Report dated Feb. 9, 2024, European Application No. 23207064.9, pp. 1-10.

* cited by examiner

METHOD AND DEVICE FOR EYE TRACKING USING EVENT CAMERA DATA

CROSS-REFERENCE TO RELATED APPLICATIONS

This application is a continuation of U.S. Non-Provisional patent application Ser. No. 17/481,272, filed on Sep. 21, 2021, which is a continuation of U.S. Non-Provisional patent application Ser. No. 16/651,228, filed on Mar. 26, 2020, which is a national stage entry of Intl. Patent App. No. PCT/US2018/053143, filed on Sep. 27, 2018, which claims priority to U.S. Provisional Patent App. No. 62/564,875, filed on Sep. 28, 2017, all of which are hereby incorporated by reference in their entirety.

TECHNICAL FIELD

The present disclosure generally relates to eye tracking, and in particular, to systems, methods, and devices for eye tracking using event camera data.

BACKGROUND

In various implementations, a head-mounted device includes an eye tracking system that determines a gaze direction of a user of the head-mounted device. The eye tracking system often includes a camera that transmits images of the eyes of the user to a processor that performs eye tracking. Transmission of the images at a sufficient frame rate to enable eye tracking requires a communication link with substantial bandwidth and using such a communication link increases heat generation and power consumption by the head-mounted device.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
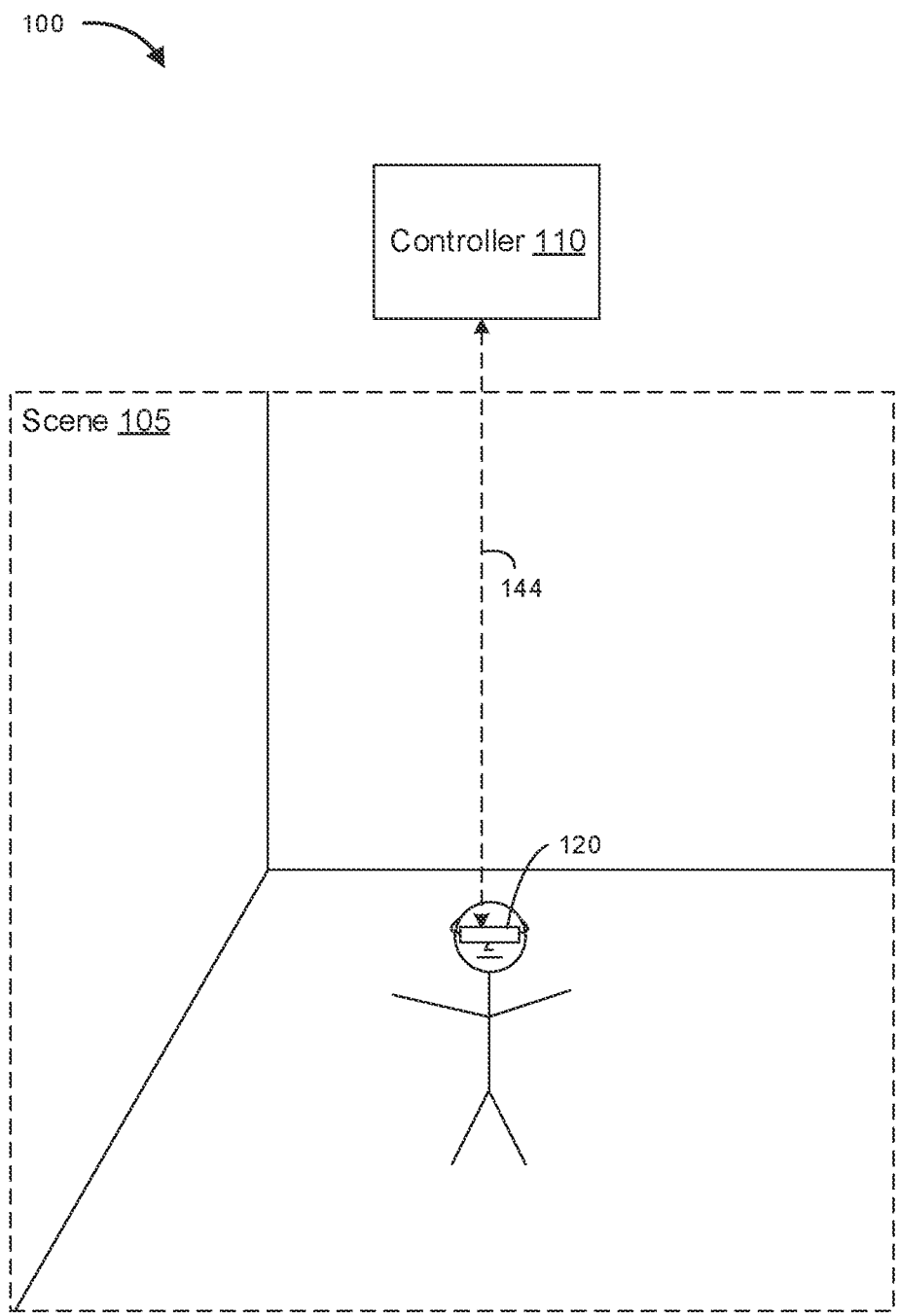
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for determining an eye tracking characteristic using intensity-modulated light sources. The method includes emitting light with modulating intensity from a plurality of light sources towards an eye of a user. The method includes receiving light intensity data indicative of an intensity of the emitted light reflected by the eye of the user in the form of a plurality of glints. The method includes determining an eye tracking characteristic of the user based on the light intensity data.

Various implementations disclosed herein include devices, systems, and methods for determining an eye tracking characteristic using an event camera. The method includes generating, using an event camera comprising a plurality of light sensors at a plurality of respective locations, a plurality of event messages, each of the plurality of event messages being generated in response to a particular light sensor detecting a change in intensity of light and indicating a particular location of the particular light sensor. The method includes determining an eye tracking characteristic of a user based on the plurality of event messages.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, eye tracking is used to enable user interaction, provide foveated rendering, or reduce geometric distortion. An eye tracking system includes a light source, a camera, and a processor that performs eye tracking on data received from the camera regarding light from the light source reflected off the eye of a user. In various implementations, the camera includes an event camera with a plurality of light sensors at a plurality of respective locations that, in response to a particular light sensor detecting a change in intensity of light, generates an event message indicating a particular location of the particular light sensor. An event camera may include or be referred to as a dynamic vision sensor (DVS), a silicon retina, an event-based camera, or a frame-less camera. Thus, the event camera generates (and transmits) data regarding changes in light intensity as opposed to a larger amount of data regarding absolute intensity at each light sensor. Further, because data is generated when intensity changes, in various implementations, the light source emits light with modulating intensity.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some embodiments, the controller 110 is configured to manage and coordinate an augmented reality/virtual reality (AR/VR) experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some embodiments, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some embodiments, the HMD 120 is configured to present the AR/VR experience to the user. In some embodiments, the HMD 120 includes a suitable combination of software, firmware, and/or hardware. The HMD 120 is described in greater detail below with respect to FIG. 3. In some embodiments, the functionalities of the controller 110 are provided by and/or combined with the HMD 120.

According to some embodiments, the HMD 120 presents an augmented reality/virtual reality (AR/VR) experience to the user while the user is virtually and/or physically present within the scene 105. In some embodiments, while presenting an augmented reality (AR) experience, the HMD 120 is configured to present AR content and to enable optical see-through of the scene 105. In some embodiments, while presenting a virtual reality (VR) experience, the HMD 120 is configured to present VR content and to enable video pass-through of the scene 105.

In some embodiments, the user wears the HMD 120 on his/her head. As such, the HMD 120 includes one or more AR/VR displays provided to display the AR/VR content. For example, the HMD 120 encloses the field-of-view of the user. In some embodiments, the HMD 120 is replaced with a handheld electronic device (e.g., a smartphone or a tablet) configured to present AR/VR content to the user. In some embodiments, the HMD 120 is replaced with an AR/VR chamber, enclosure, or room configured to present AR/VR content in which the user does not wear or hold the HMD 120.

Figure 2:
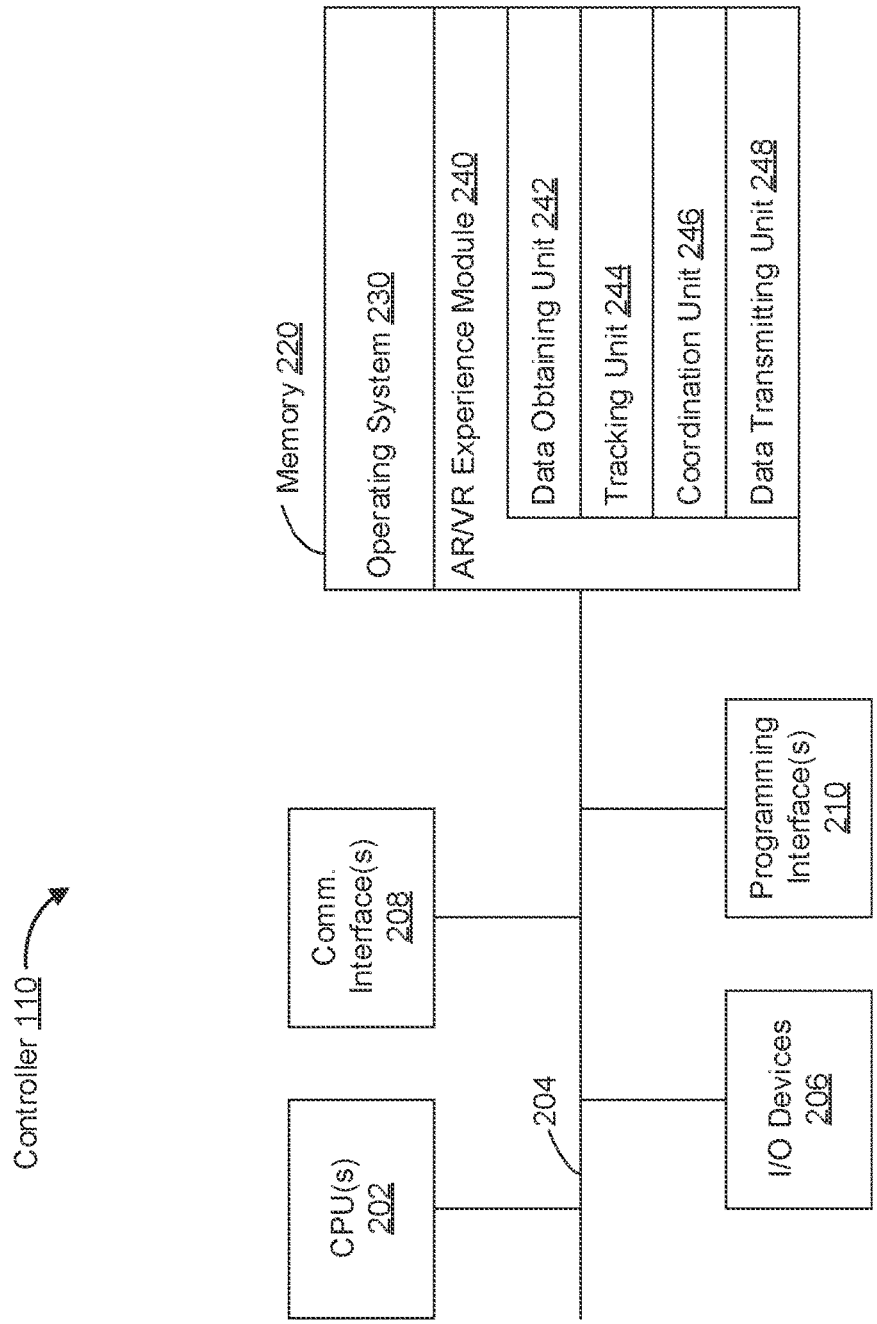
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an augmented reality/virtual reality (AR/VR) experience module 240.

The operating system 230 includes procedures for handling various basic system services and for performing hardware dependent tasks. In some implementations, the AR/VR experience module 240 is configured to manage and coordinate one or more AR/VR experiences for one or more users (e.g., a single AR/VR experience for one or more users, or multiple AR/VR experiences for respective groups of one or more users). To that end, in various implementations, the AR/VR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the AR/VR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 3:
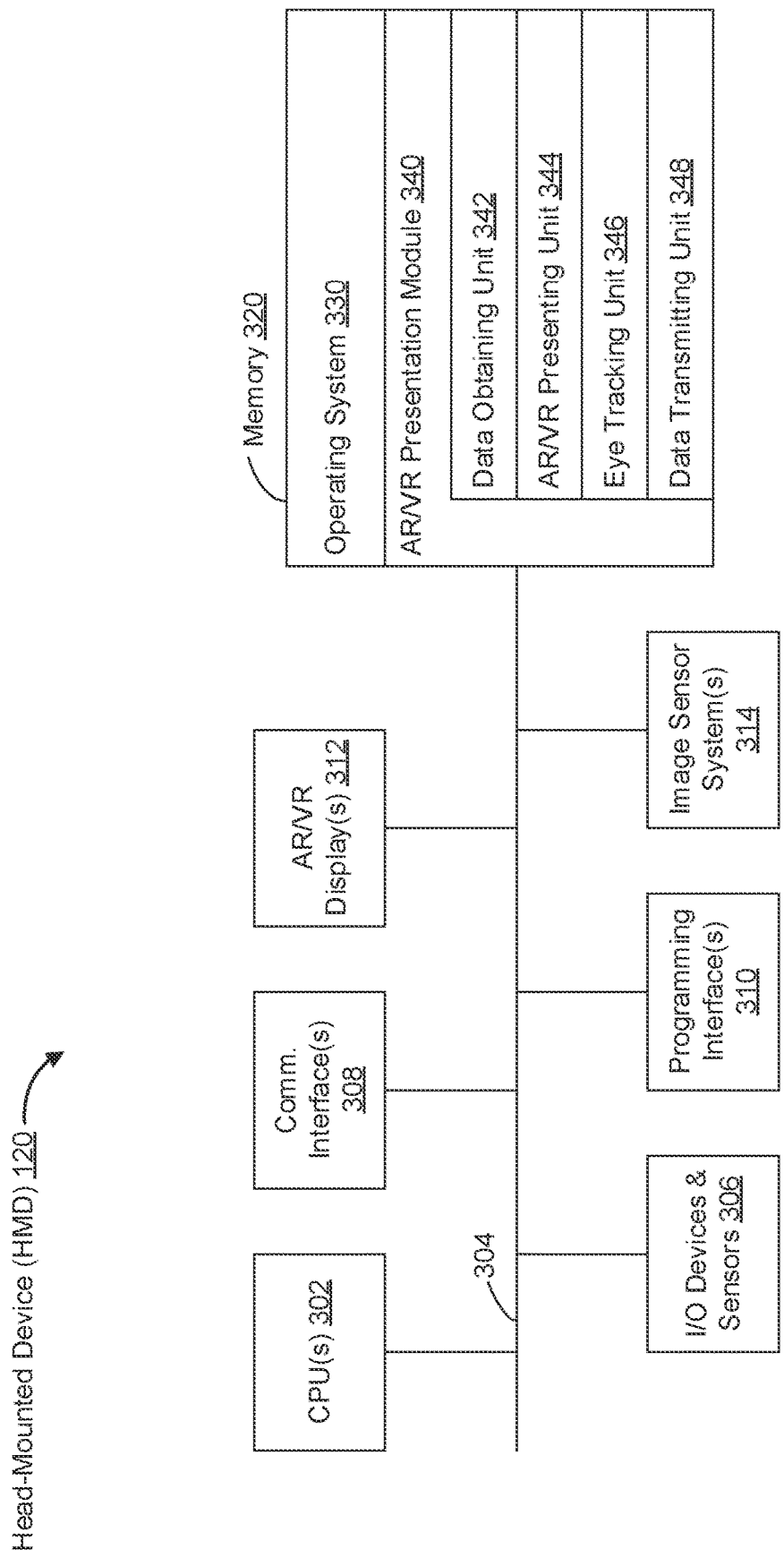
FIG. 3 is a block diagram of an example head-mounted device (HMD) in accordance with some implementations.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more AR/VR displays 312 are configured to present the AR/VR experience to the user. In some embodiments, the one or more AR/VR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more AR/VR displays 312 correspond to diffractive, reflective, polarized, holographic, etc. waveguide displays. For example, the HMD 120 includes a single AR/VR display. In another example, the HMD 120 includes an AR/VR display for each eye of the user. In some embodiments, the one or more AR/VR displays 312 are capable of presenting AR and VR content. In some embodiments, the one or more AR/VR displays 312 are capable of presenting AR or VR content.

In some implementations, the one or more image sensor systems 314 are configured to obtain image data that corresponds to at least a portion of the face of the user that includes the eyes of the user. For example, the one or more image sensor systems 314 include one or more RGB camera (e.g., with a complimentary metal-oxide-semiconductor (CMOS) image sensor or a charge-coupled device (CCD) image sensor), monochrome camera, IR camera, event-based camera, and/or the like. In various implementations, the one or more image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, an AR/VR presentation module 340, and a user data store 360.

The operating system 330 includes procedures for handling various basic system services and for performing hardware dependent tasks. In some implementations, the AR/VR presentation module 340 is configured to present AR/VR content to the user via the one or more AR/VR displays 312. To that end, in various implementations, the AR/VR presentation module 340 includes a data obtaining unit 342, an AR/VR presenting unit 344, an eye tracking unit 346, and a data transmitting unit 348.

In some implementations, the data obtaining unit 342 is configured to obtain data (e.g., presentation data, interaction data, sensor data, location data, etc.) from at least the controller 110. To that end, in various implementations, the data obtaining unit 342 includes instructions and/or logic therefor, and heuristics and metadata therefor.

In some implementations, the AR/VR presenting unit 344 is configured to present AR/VR content via the one or more AR/VR displays 312. To that end, in various implementations, the AR/VR presenting unit 344 includes instructions and/or logic therefor, and heuristics and metadata therefor.

In some implementations, the eye tracking unit 346 is configured to determine an eye tracking characteristic of a user based on event messages received from an event camera. To that end, in various implementations, the eye tracking unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the AR/VR presenting unit 344, the eye tracking unit 346, and the data transmitting unit 348 are shown as residing on a single device (e.g., the HMD 120), it should be understood that in other implementations, any combination of the data obtaining unit 342, the AR/VR presenting unit 344, the eye tracking unit 346, and the data transmitting unit 348 may be located in separate computing devices.

Moreover, FIG. 3 is intended more as functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4:
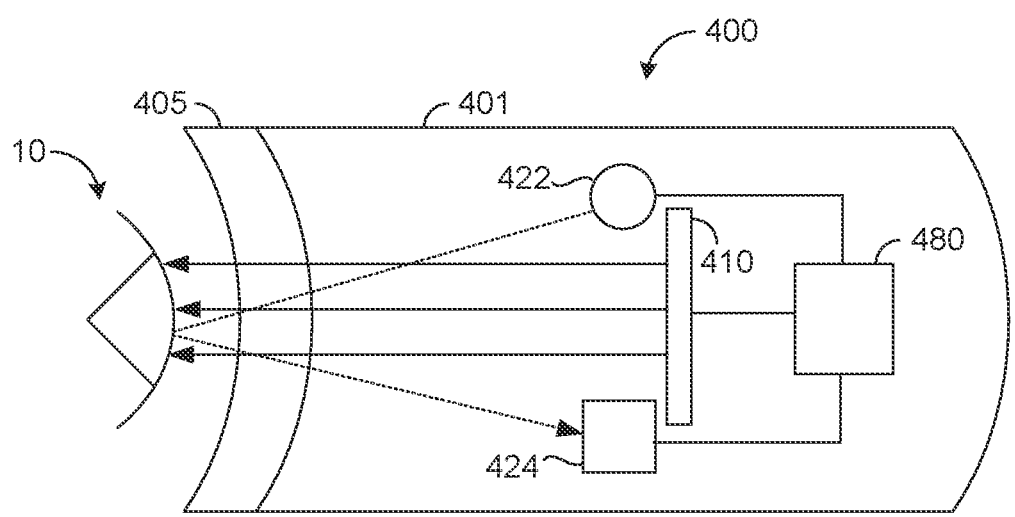
FIG. 4 illustrates a block diagram of a head-mounted device in accordance with some implementations.

FIG. 4 illustrates a block diagram of a head-mounted device 400 in accordance with some implementations. The head-mounted device 400 includes a housing 401 (or enclosure) that houses various components of the head-mounted device 400. The housing 401 includes (or is coupled to) an eye pad 405 disposed at a proximal (to the user 10) end of the housing 401. In various implementations, the eye pad 405 is a plastic or rubber piece that comfortably and snugly keeps the head-mounted device 400 in the proper position on the face of the user 10 (e.g., surrounding the eye of the user 10).

The housing 401 houses a display 410 that displays an image, emitting light towards onto the eye of a user 10. In various implementations, the display 410 emits the light through an eyepiece (not shown) that refracts the light emitted by the display 410, making the display appear to the user 10 to be at a virtual distance farther than the actual distance from the eye to the display 410. For the user to be able to focus on the display 410, in various implementations, the virtual distance is at least greater than a minimum focal distance of the eye (e.g., 7 cm). Further, in order to provide a better user experience, in various implementations, the virtual distance is greater than 1 m.

Although FIG. 4 illustrates a head-mounted device 400 including a display 410 and an eye pad 405, in various implementations, the head-mounted device 400 does not include a display 410 or includes an optical see-through display without including an eye pad 405.

The housing 401 also houses an eye tracking system including one or more light sources 422, a camera 424, and a controller 480. The one or more light sources 422 emit light onto the eye of the user 10 that reflects as a light pattern (e.g., a circle of glints) that can be detected by the camera 424. Based on the light pattern, the controller 480 can determine an eye tracking characteristic of the user 10. For example, the controller 480 can determine a gaze direction and/or a blinking state (eyes open or eyes closed) of the user 10. As another example, the controller 480 can determine a pupil center, a pupil size, or a point of regard. Thus, in various implementations, the light is emitted by the one or more light sources 422, reflects off the eye of the user 10, and is detected by the camera 424. In various implementations, the light from the eye of the user 10 is reflected off a hot mirror or passed through an eyepiece before reaching the camera 424.

The display 410 emits light in a first wavelength range and the one or more light sources 422 emit light in a second wavelength range. Similarly, the camera 424 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 10 selects an option on the display 410 by looking at it), provide foveated rendering (e.g., present a higher resolution in an area of the display 410 the user 10 is looking at and a lower resolution elsewhere on the display 410), or reduce geometric distortion (e.g., in 3D rendering of objects on the display 410).

Figure 5A:
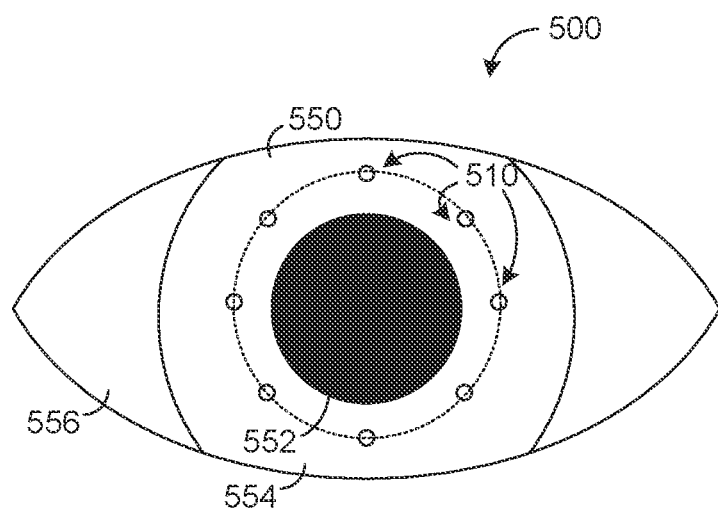
FIG. 5A illustrates an eye of a user having a first gaze direction in accordance with some implementations.
Figure 5B:
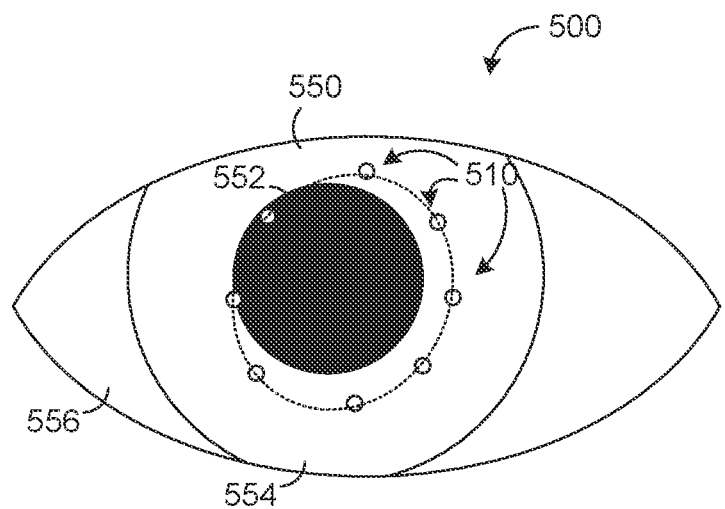
FIG. 5B illustrates the eye of the user having a second gaze direction in accordance with some implementations.
Figure 6A:
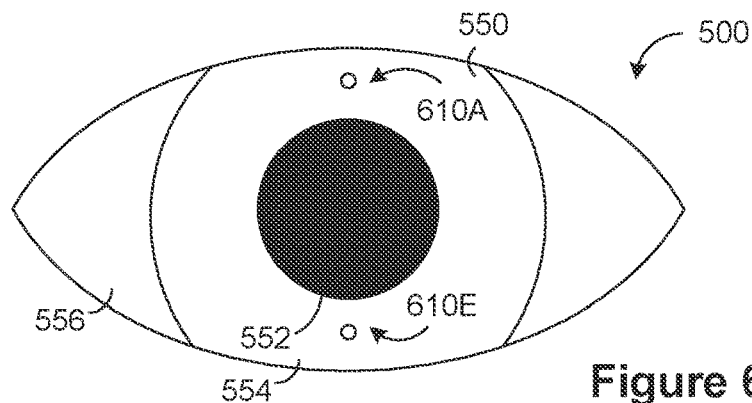
FIGS. 6A-6D illustrates the eye of the user of FIG. 5 at a different times in accordance with some implementations.
Figure 6B:
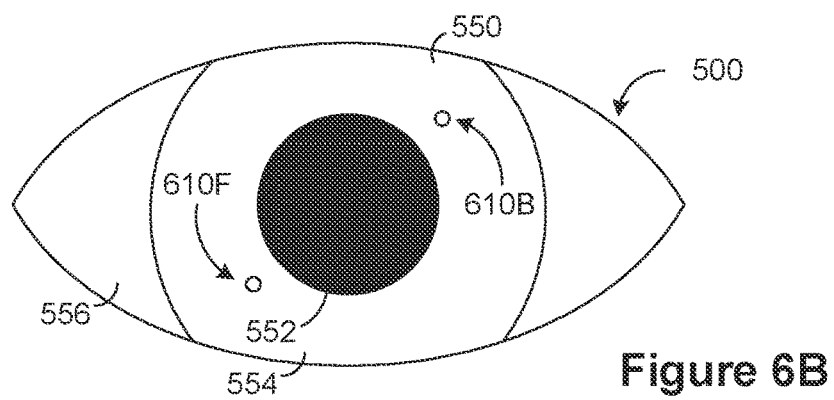
Figure 6C:
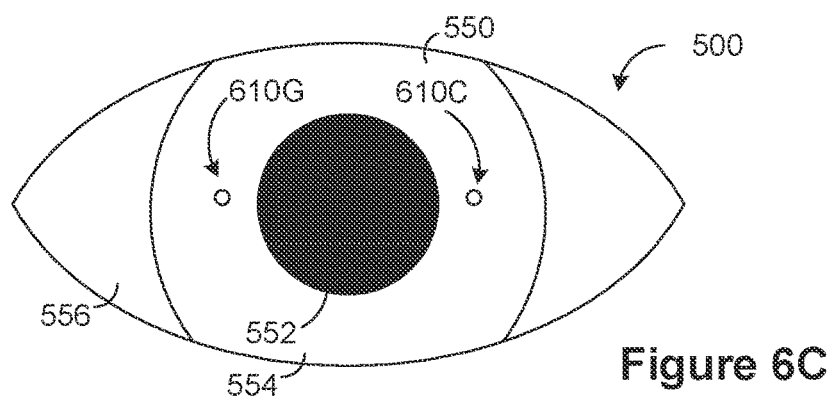
Figure 6D:
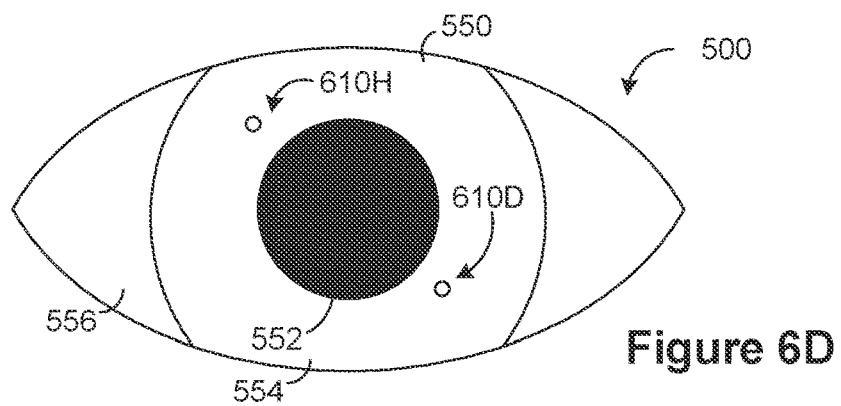

In various implementations, the one or more light sources 422 emit light towards the eye of the user which reflects in the form of a plurality of glints. FIG. 5A illustrates an eye 500 of a user having a first gaze direction in accordance with some implementations. FIG. 5B illustrates the eye 500 of the user having a second gaze direction in accordance with some implementations. The eye 500 includes a pupil 552 surrounded by an iris 554, both covered by a cornea 550. The eye 500 also includes a sclera 556 (also known as the white of the eye 500). When the user has a first gaze direction (as in FIG. 5A), a light emitted by the plurality of light sources 422 arranged in a pattern (e.g., a circle) are reflected by the cornea 550 in form of a plurality of glints 510 with a first pattern (also a circle in FIG. 5A). When the user has a second gaze direction (as in FIG. 5B), the light emitted by the plurality of light sources 422 arranged in the same pattern are reflected by the cornea 550 in the form of a plurality of glints 510 with a second pattern (a tilted ellipse in FIG. 5B). Accordingly, based on the reflected pattern (and, potentially, other features, such as the pupil size, pupil shape, and pupil center), an eye tracking characteristic of the user can be determined.

In various implementations, the one or more light sources 422 (of FIG. 4) emit light with modulating intensity towards the eye of the user. Accordingly, at a first time, a first light source of the plurality of light sources is projected onto the eye of the user with a first intensity and, at a second time, the first light source of the plurality of light sources is projected onto the eye of the user with a second intensity different than the first intensity (which may be zero, e.g., off).

FIGS. 6A-6D illustrates the eye 500 of the user of FIG. 5 at a different times in accordance with some implementations. A plurality of glints 610A-610H result from light emitted towards the eye 500 of the user (and reflected by the cornea 550) with modulating intensity. For example, at a first time (in FIG. 6A), a first glint 610A and a fifth glint 610E of the plurality of glints 610A-610H are reflected by the eye 500 of the user with a first intensity. At a second time (in FIG. 6B) later than the first time, the intensity of the first glint 610A and the fifth glint 610E is modulated to a second intensity (e.g., zero). Also at the second time, a second glint 610B and a sixth glint 610F of the plurality of glints 610A-610H are reflected from the eye 500 of the user with the first intensity. At a third time (in FIG. 6C) later than the second time, a third glint 610C and a seventh glint 610G of the plurality of glints 610A-610H are reflected by the eye 500 of the user with the first intensity. At a fourth time (in FIG. 6D) later than the third time, a fourth glint 610D and a eighth glint 610H of the plurality of glints 610A-610H are reflected from the eye 500 of the user with the first intensity. At a fifth time (back in FIG. 6A) later than the fourth time, the intensity of the first glint 610A and the fifth glint 610E is modulated back to the first intensity.

Thus, in various implementations, each of the plurality of glints 610A-610H blinks on and off at a modulation frequency (e.g., 600 Hz). However, the phase of the second glint 610B is offset from the phase of the first glint 610A, the phase of the third glint 610C is offset from the phase of the second glint 610B, etc., such that glints appear to be rotating about the cornea 550.

Accordingly, in various implementations, the intensity of different light sources in the plurality of light sources is modulated in different ways. Thus, when a glint, reflected by the eye and detected by the camera 424) is analyzed, the identity of the glint and the corresponding light source (e.g., which light source produced the glint that has been detected) can be determined.

In various implementations, the one or more light sources 422 (of FIG. 4A) are differentially modulated in various ways. In various implementations, a first light source of the plurality of light sources is modulated at a first frequency with a first phase offset (e.g., first glint 610A of FIG. 6A) and a second light source of the plurality of light sources is modulated at the first frequency with a second phase offset (e.g., second glint 610B of FIG. 6B).

In various implementations, the one or more light sources 422 modulate the intensity of emitted light with different modulation frequencies. For example, in various implementations, a first light source of the plurality of light sources is modulated at a first frequency (e.g., 600 Hz) and a second light source of the plurality of light sources is modulated at a second frequency (e.g., 500 Hz).

In various implementations, the one or more light sources 422 modulate the intensity of emitted light according to different orthogonal codes, such as those which may be used in CDMA (code-divisional multiplex access) communications. For example, the rows or columns of a Walsh matrix can be used as the orthogonal codes. Accordingly, in various implementations, a first light source of the plurality of light sources is modulated according to a first orthogonal code and a second light source of the plurality of light sources is modulated according to a second orthogonal code.

In various implementations, the one or more light sources 422 modulate the intensity of emitted light between a high intensity value and a low intensity value. Thus, at various times, the intensity of the light emitted by the light source is either the high intensity value or the low intensity value. In various implementation, the low intensity value is zero. Thus, in various implementations, the one or more light sources 422 modulate the intensity of emitted light between an on state (at the high intensity value) and an off state (at the low intensity value). In various implementations (as in FIGS. 6A-6D) the number of light sources of the plurality of light sources in the on state is constant.

In various implementations, the one or more light sources 422 modulate the intensity of emitted light within an intensity range (e.g., between 10% maximum intensity and 40% maximum intensity). Thus, at various times, the intensity of the light source is either a low intensity value, a high intensity value, or some value in between. In various implementations, the one or more light sources 422 are differentially modulated such that a first light source of the plurality of light sources is modulated within a first intensity range and a second light source of the plurality of light sources is modulated within a second intensity range different than the first intensity range.

In various implementations, the one or more light sources 422 modulate the intensity of emitted light according to a gaze direction. For example, if a user is gazing in a direction in which a particular light source would be reflected by the pupil (e.g., the upper-left glint in FIG. 5B), the one or more light sources 422 changes the intensity of the emitted light based on this knowledge. In various implementations, the one or more light sources 422 decrease the intensity of the emitted light to decrease the amount of near-infrared light from entering the pupil as a safety precaution.

In various implementations, the one or more light sources 422 modulate the intensity of emitted light according to user biometrics. For example, if the user is blinking more than normal, has an elevated heart rate, or is registered as a child, the one or more light sources 422 decreases the intensity of the emitted light (or the total intensity of all light emitted by the plurality of light sources) to reduce stress upon the eye. As another example, the one or more light sources 422 modulate the intensity of emitted light based on an eye color of the user, as spectral reflectivity may differ for blue eyes as compared to brown eyes.

In various implementations, the one or more light sources 422 modulate the intensity of emitted light according to a presented user interface (e.g., what is displayed on the display 410). For example, if the display 410 is unusually bright (e.g., a video of an explosion is being displayed), the one or more light sources 422 increase the intensity of the emitted light to compensate for potential interference from the display 410.

In various implementations, the camera 424 is a frame camera that, at a particular point in time or multiple points in time at a frame rate, generates an image of the eye of the user 10. Each image includes a matrix of pixel values corresponding to pixels of the image which correspond to locations of a matrix of light sensors of the camera.

In various implementations, the camera 424 is an event camera comprising a plurality of light sensors (e.g., a matrix of light sensors) at a plurality of respective locations that, in response to a particular light sensor detecting a change in intensity of light, generates an event message indicating a particular location of the particular light sensor.

Figure 7:
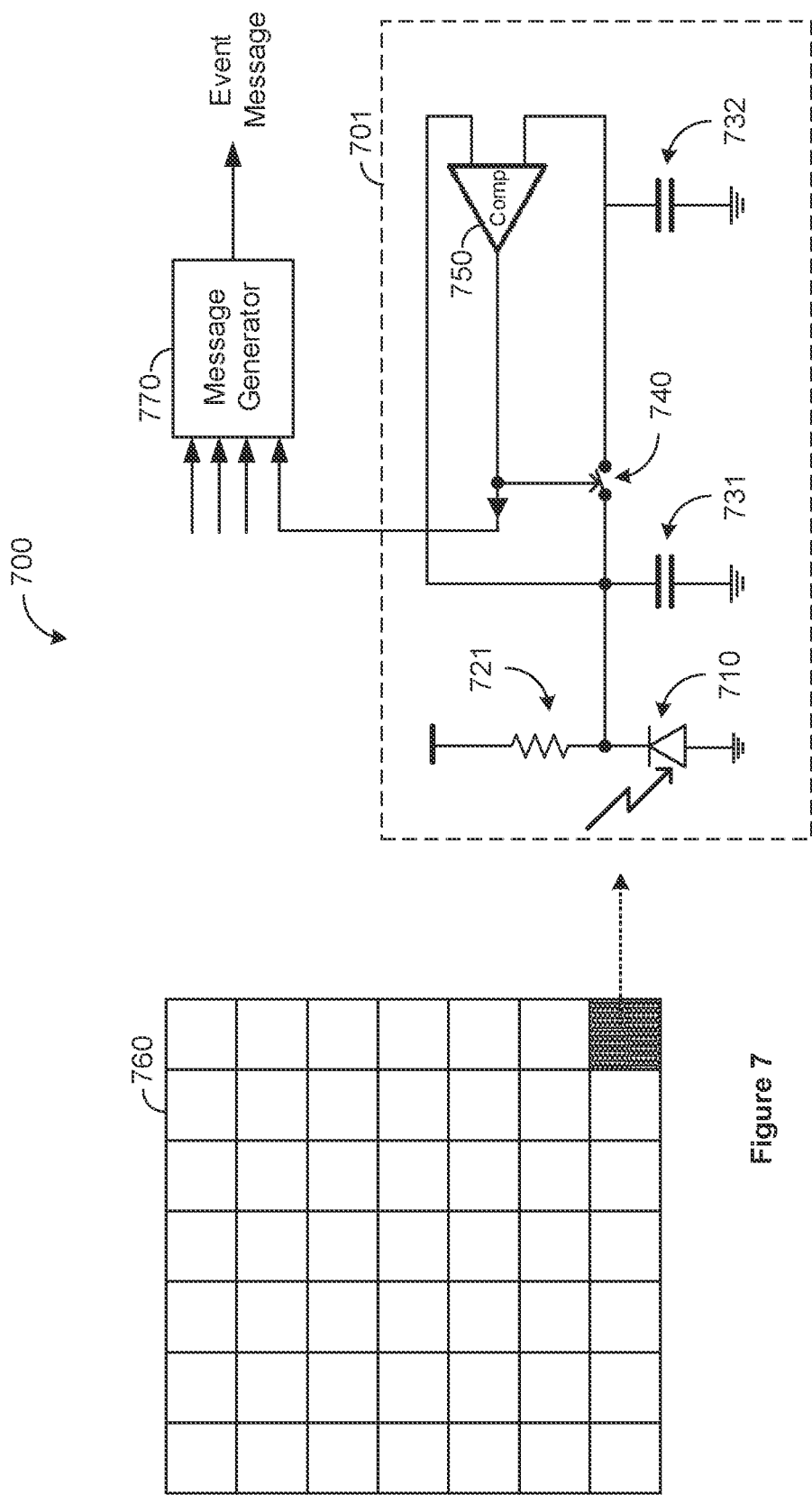
FIG. 7 illustrates a functional block diagram of an event camera in accordance with some implementations.

FIG. 7 illustrates a functional block diagram of an event camera 700 in accordance with some implementations. The event camera 700 includes a plurality of light sensors 760 respectively coupled to a message generator 770. In various implementations, the plurality of light sensors 760 arranged in a matrix of rows and columns and, thus, each of the plurality of light sensors 760 is associated with a row value and a column value.

The plurality of light sensors 760 includes a light sensor 701 illustrated in detail in FIG. 7. The light sensor 701 includes a photodiode 710 in series with a resistor 721 between a source voltage and a ground voltage. The voltage across the photodiode 710 is proportional to the intensity of light impinging on the light sensor 701. The light sensor 701 includes a first capacitor 731 in parallel with the photodiode 710. Accordingly, the voltage across the first capacitor 731 is the same as the voltage across the photodiode 710 (e.g., proportional to the intensity of light detected by the light sensor 701).

The light sensor 701 includes a switch 740 coupled between the first capacitor 731 and a second capacitor 732. The second capacitor 732 is coupled between the switch and the ground voltage. Accordingly, when the switch 740 is closed, the voltage across the second capacitor 732 is the same as the voltage across the first capacitor 731 (e.g., proportional to the intensity of light detected by the light sensor 701). When the switch 740 is open, the voltage across the second capacitor 732 is fixed at the voltage across the second capacitor 732 when the switch 740 was last closed.

The voltage across the first capacitor 731 and the voltage across the second capacitor 732 are fed to a comparator 750. When the difference between the voltage across the first capacitor 731 and the voltage across the second capacitor 732 is less than a threshold amount, the comparator 750 outputs a '0' voltage. When the voltage across the first capacitor 731 is higher than the voltage across the second capacitor 732 by at least the threshold amount, the comparator 750 outputs a '1' voltage. When the voltage across the first capacitor 731 is less than the voltage across the second capacitor 732 by at least the threshold amount, the comparator 750 outputs a '-1' voltage.

When the comparator 750 outputs a '1' voltage or a '-1' voltage, the switch 740 is closed and the message generator 770 receives this digital signal and generates an event message (as described further below)

As an example, at a first time, the intensity of light impinging on the light sensor 701 is a first light value. Accordingly, the voltage across the photodiode 710 is a first voltage value. Likewise, the voltage across the first capacitor 731 is the first voltage value. For this example, the voltage across the second capacitor 732 is also the first voltage value. Accordingly, the comparator 750 outputs a '0' voltage, the switch 740 remains closed, and the message generator 770 does nothing.

At a second time, the intensity of light impinging on the light sensor 701 increases to a second light value. Accordingly, the voltage across the photodiode 710 is a second voltage value (higher than the first voltage value). Likewise, the voltage across the first capacitor 731 is the second voltage value. Because the switch 740 is open, the voltage across the second capacitor 732 is still the first voltage value.

Assuming that the second voltage value is at least the threshold value greater than the first voltage value, the comparator 750 outputs a '1' voltage, closing the switch 740, and the message generator 770 generates an event message based on the received digital signal.

With the switch 740 closed by the '1' voltage from the comparator 750, the voltage across the second capacitor 732 is changed from the first voltage value to the second voltage value. Thus, the comparator 750 outputs a '0' voltage, opening the switch 740.

At a third time, the intensity of light impinging on the light sensor 701 increases (again) to a third light value. Accordingly, the voltage across the photodiode 710 is a third voltage value (higher than the second voltage value). Likewise, the voltage across the first capacitor 731 is the third voltage value. Because the switch 740 is open, the voltage across the second capacitor 732 is still the second voltage value. Assuming that the third voltage value is at least the threshold value greater than the second voltage value, the comparator 750 outputs a '1' voltage, closing the switch 740, and the message generator 770 generates an event message based on the received digital signal.

With the switch 740 closed by the '1' voltage from the comparator 750, the voltage across the second capacitor 732 is changed from the second voltage value to the third voltage value. Thus, the comparator 750 outputs a '0' voltage, opening the switch 740.

At a fourth time, the intensity of light impinging on the light sensor 701 decreases back to second light value. Accordingly, the voltage across the photodiode 710 is the second voltage value (less than the third voltage value). Likewise, the voltage across the first capacitor 731 is the second voltage value. Because the switch 740 is open, the voltage across the second capacitor 732 is still the third voltage value. Thus, the comparator 750 outputs a '−1' voltage, closing the switch 740, and the message generator 770 generates an event message based on the received digital signal.

With the switch 740 closed by the '-1' voltage from the comparator 750, the voltage across the second capacitor 732 is changed from the third voltage value to the second voltage value. Thus, the comparator 750 outputs a '0' voltage, opening the switch 740.

The message generator 770 receives, at various times, digital signals from each of the plurality of light sensors 760 indicating an increase in the intensity of light ('1' voltage) or a decrease in the intensity of light ('−1' voltage). In response to receiving a digital signal from a particular light sensor of the plurality of light sensors 760, the message generator 770 generates an event message.

Figure 8:
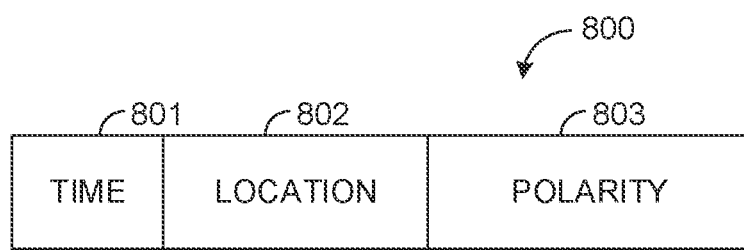
FIG. 8 illustrates a data diagram of an event message in accordance with some implementations.

FIG. 8 illustrates a data diagram of an event message 800 in accordance with some implementations. In various implementations, the event message 800 indicates, in a location field 802, the particular location of the particular light sensor. In various implementations, the event message indicates the particular location with a pixel coordinate, such as a row value (e.g., in a row field) and a column value (e.g., in a column field). In various implementations, the event message further indicates, in a polarity field 803, the polarity of the change in intensity of light. For example, the event message may include a '1' in the polarity field 803 to indicate an increase in the intensity of light and a '0' in the polarity field 803 to indicate a decrease in the intensity of light. In various implementations, the event message further indicates, in a time field 801, a time the change in intensity in light was detected (e.g., a time the digital signal was received). In various implementations, the event message indicates, in an absolute intensity field (not shown), as an alternative to or in addition to the polarity, a value indicative of the intensity of detected light.

Figure 9A:
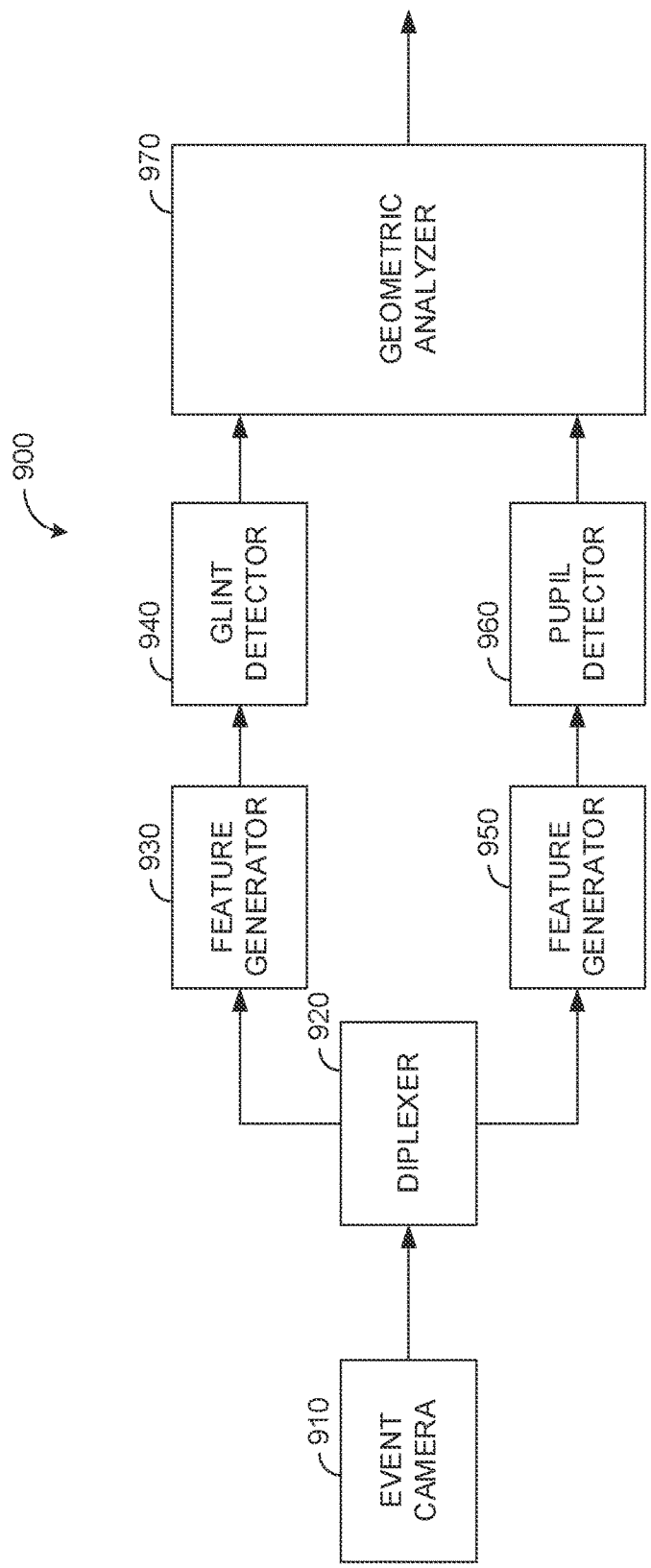
FIG. 9A illustrates a functional block diagram of an eye tracking system including an event camera in accordance with some implementations.

FIG. 9A illustrates a functional block diagram of an eye tracking system 900 including an event camera 910 in accordance with some implementations. The eye tracking system 900 outputs a gaze direction of a user based on event messages received from the event camera 910.

The event camera 910 comprises a plurality of light sensors at a plurality of respective locations. In response to a particular light sensor detecting a change in intensity of light, the event camera 910 generates an event message indicating a particular location of the particular light sensor. As describe above with respect to FIG. 8, in various implementations, the particular location is indicated by a pixel coordinate. In various implementations, the event message further indicates a polarity of the change in intensity of light. In various implementations, the event message further indicates a time at which the change in intensity of light was detected. In various implementations, the event message further indicates a value indicative of the intensity of detected light.

The event messages from the event camera 910 are received by a diplexer 920. The diplexer 920 separates the event message into target-frequency event messages (associated with a frequency band centered around a frequency of modulation of one or more light sources) and off-target-frequency event messages (associated with other frequencies), feeding the target-frequency event messages to a first feature generator 930 coupled to a glint detector 940 and feeding the off-target-frequency event messages to a second feature generator 950 coupled to a pupil detector 960. In some implementations, the first feature generator 930 and/or the second feature generator 950 are absent, and the target-frequency event messages and/or the off-target frequency event messages are respectively fed directly to the glint detector 940 and/or the pupil detector 960.

In various implementations, the diplexer 920 determines that an event message is a target-frequency event message (or an off-target frequency event message) based on a timestamp, in a time field, indicating a time at which the change in intensity of light was detected. For example, in various implementations, the diplexer 920 determines that an event message is a target-frequency event message if it is one of a set including number of event messages within a set range indicating a particular location within a set amount of time. Otherwise, the diplexer 920 determines that the event message is an off-target-frequency event message. In various implementations, the set range and/or the set amount of time are proportional to a modulation frequency of modulated light emitted towards the eye of the user. As another example, in various implementations, the diplexer 920 determines that an event message is a target-frequency event message if the time between successive events with similar or opposite polarity is within a set range of times.

The second feature generator 950 receives the off-target frequency event messages and generates one or more off-target features based on the off-target frequency event messages. In one embodiment, the off-target feature is an approximate intensity image. In various implementations, the approximate intensity image includes an image having a plurality of pixel values at a respective plurality of pixels corresponding to the respective locations of the light sensors. Upon receiving an event message indicating a particular location and a positive polarity (indicating that the intensity of light has increased), an amount (e.g., 1) is added to the pixel value at the pixel corresponding to the particular location. Similarly, upon receiving an event message indicating a particular location and a negative polarity (indicating that the intensity of light has decreased), the amount is subtracted from the pixel value at the pixel corresponding to the particular location. In various implementations, the approximate intensity image is filtered, e.g., blurred. In one embodiment, the off-target feature is a positive timestamp image having a plurality of pixel values at a respective plurality of pixels corresponding to the respective locations of the light sensors, where the pixels values are a timestamp indicating when the corresponding light sensor triggered the last event with positive polarity. In one embodiment, the off-target feature is a negative timestamp image having a plurality of pixel values at a respective plurality of pixels corresponding to the respective locations of the light sensors, where the pixels values are a timestamp indicating when the corresponding light sensor triggered the last event with negative polarity. In one embodiment, the off-target feature is a frequency image having a plurality of pixel values at a respective plurality of pixels corresponding to the respective locations of the light sensors, where the pixels values are a measure of the frequency of event messages received from the corresponding light sensor. In various implementations, the off-target feature can be other features based on the off-target frequency event messages.

The off-target feature is received by a pupil detector 960. In one embodiment, the off-target feature is an approximate intensity image and the pupil detector 960 locates a low-intensity region in the approximate intensity image. In various implementations, the pupil detector 960 locates a region (of at least a threshold size) having pixel values less than the threshold. In various implementations, this region corresponds to the pupil of the eye of the user. In various implementations, the pupil detector 960 fits an ellipse to the low-intensity region and generates ellipse data regarding the ellipse.

In various implementations, the pupil detector 960 performs pupil tracking in addition to initial pupil detection. In various implementations, the pupil detector 960 locates one or more high-contrast edges based on the off-target-frequency event messages and/or the off-target feature and fits a new ellipse based on the one or more high-contrast edges and a prior ellipse.

In various implementations, the pupil detector 960 ellipse data regarding the new ellipse and/or a prior ellipse is provided to a geometric analyzer 970. In various implementations, the ellipse data includes one or more of a center (corresponding to a pupil size of the pupil), a minor axis size and a major axis size (corresponding to a size of the pupil), and a rotational angle.

The first feature generator 930 receives the target-frequency event messages and generates a target feature based on the target-frequency event messages. The target feature can be any of the features described above with respect to the off-target feature, including the same or a different feature as the off-target feature. The glint detector 940 receives the target feature from the first feature generator 930. In various implementations, the glint detector 940 determines the location of one or more glints reflected from the eye of the user. In various implementations, the glint detector 940 determines the locations based on event messages that indicate an increase in intensity of light (e.g., indicating a positive polarity) without being based on event messages that indicate a decrease in intensity of light (e.g., indicating a negative polarity). In various implementations, the glint detector 940 determines the locations based on event messages that indicate a decrease in intensity of light (e.g., indicating a negative polarity) without being based on event messages that indicate an increase in intensity of light (e.g., indicating a positive polarity).

As described above, in various implementations, the glints are reflected with differential modulation (e.g., they are modulated differently). Accordingly, in various implementations, the glint detector 940 determines an identity of one or more glints in addition to their location. Thus, in various implementations, the glint detector 940 outputs, to the geometric analyzer 970, glint detection messages indicating, for one or more glints, a respective location and a respective identifier corresponding to a respective light source that produced the glint. In various implementations, the light sources and the event camera are synchronized and the relative time between the time at which the change was detected and the time at which a light source was triggered can be determined, allowing for such identification.

The geometric analyzer 970 receives data regarding detected glints from the glint detector 940 and data regarding the pupil of the eye of the user from the pupil detector 960. Based on this received information, the geometric analyzer 970 determines an eye tracking characteristic of a user, such as a gaze direction and/or a blinking state of the user.

In various implementations, for particularly robust gaze estimation, the geometric analyzer 970 differentiates glints that are reflected from the cornea from glints that are reflected from the sclera, and only uses glints that are reflected from the cornea for estimating the gaze direction. Thus, in various implementations, the geometric analyzer 970 implements measures to perform this differentiation, e.g. by applying robust estimation techniques such as RANSAC (random sample consensus), robust weighting, etc.

Figure 9B:
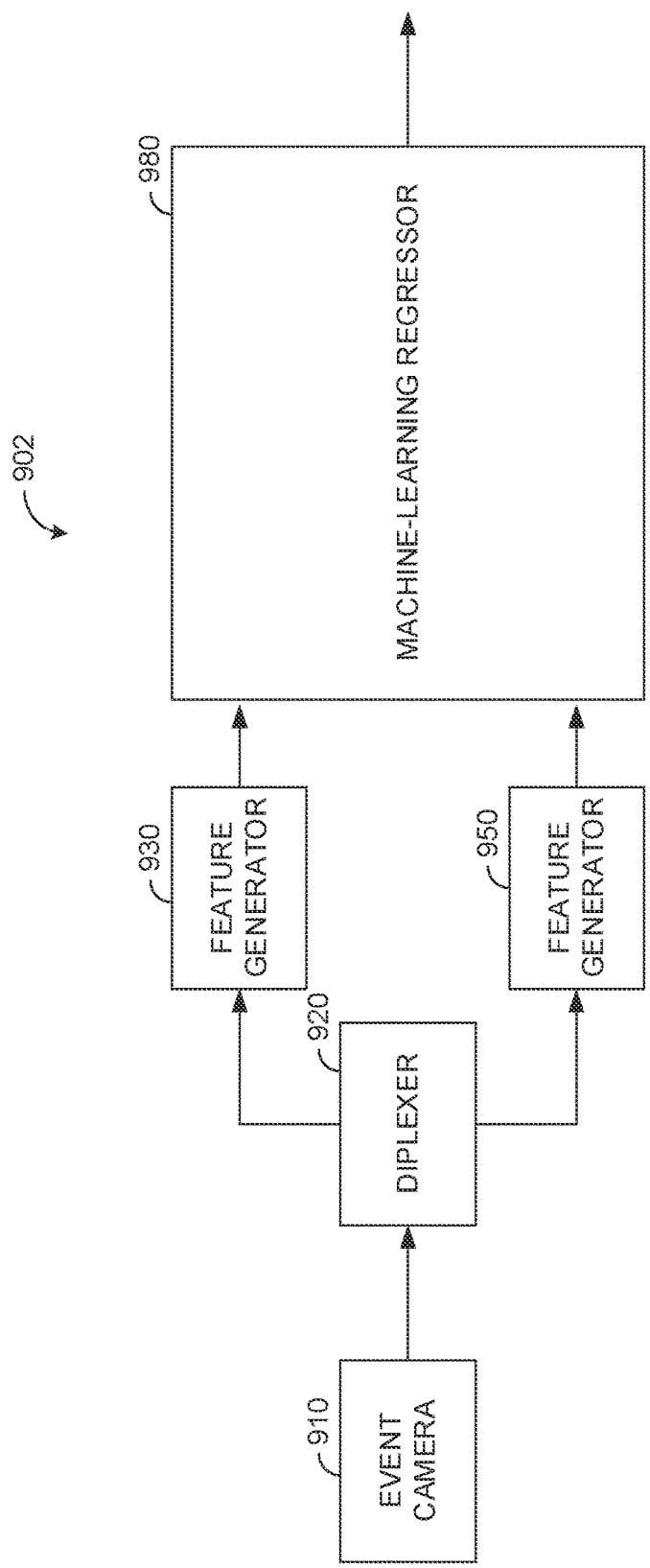
FIG. 9B illustrates a functional block diagram of an eye tracking system including a machine-learning regressor in accordance with some implementations.

FIG. 9B illustrates a functional block diagram of an eye tracking system 902 including a machine-learning regressor 980 in accordance with some implementations. The eye tracking system 902 is substantially similar to the eye tracking system 900 of FIG. 9A, but with the glint detector 940, pupil detector 960, and geometric analyzer 970 replaced by a machine-learning regressor 980 that determines the eye tracking characteristic based on the target-feature and the off-target feature. In some implementations, the first feature generator 930 and/or the second feature generator 950 are absent, and the target-frequency event messages and/or the off-target frequency event messages are respectively fed directly to the machine-learning regressor 980.

In various implementations, the machine-learning regressor 980 includes a linear regressor, a random forest regressor, an adaptive boosting regressor, or a neural network (such as a convolutional neural network, a recurrent neural network, or a long/short-term memory network).

Figure 9C:
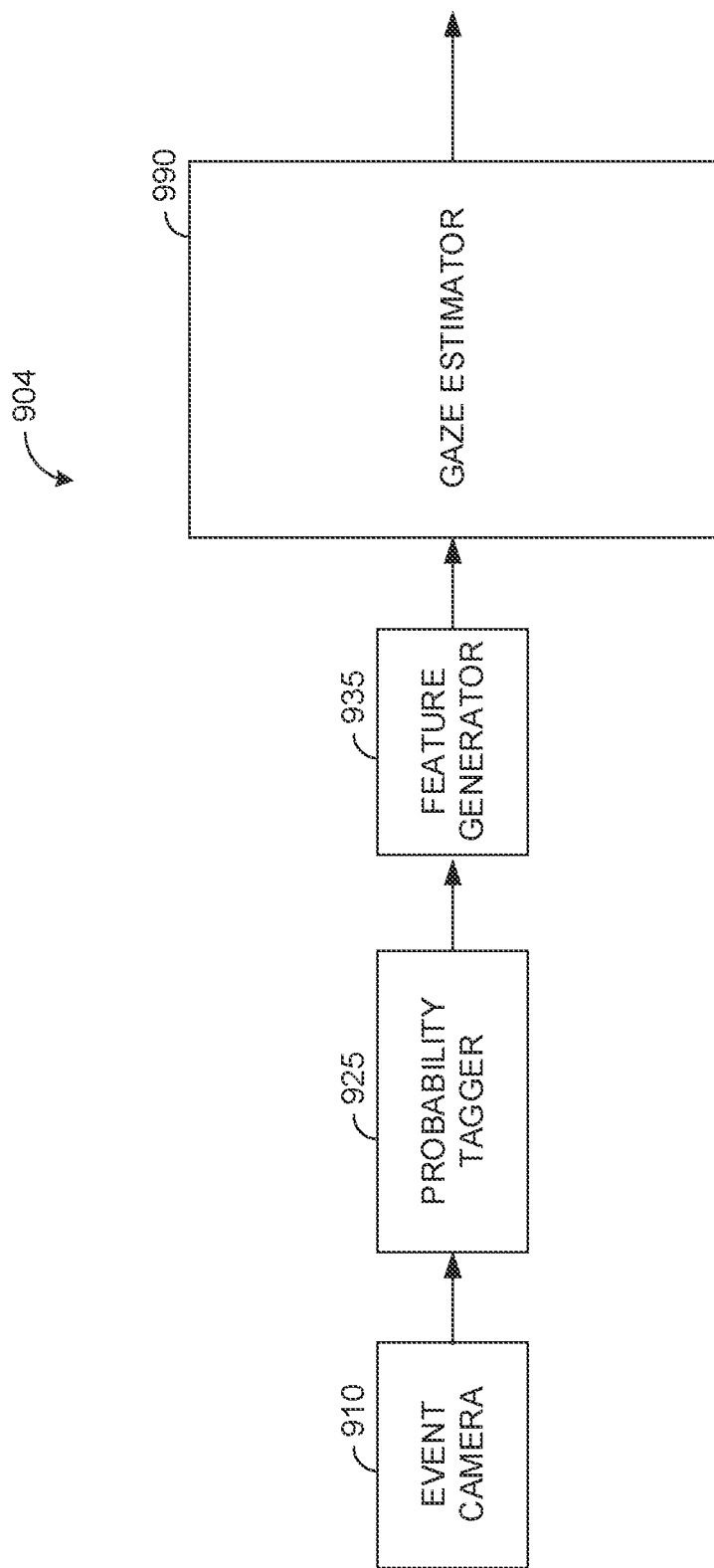
FIG. 9C illustrates a functional block diagram of an eye tracking system including a gaze estimator in accordance with some implementations.

FIG. 9C illustrates a functional block diagram of an eye tracking system 904 including a gaze estimator 990 in accordance with some implementations. The eye tracking system 904 includes the event camera 910 as described above. The event messages are fed into a probability tagger 925 that tags each event message with a probability that the event message is a target-frequency event message. The probability-tagged event messages are fed into a feature generator 935 that generates one or more features as described above with respect to the off-target feature. The one or more features are fed into a gaze estimator 990 that determines an eye tracking characteristic (e.g., a gaze direction) based on the one or more features.

Figure 10:
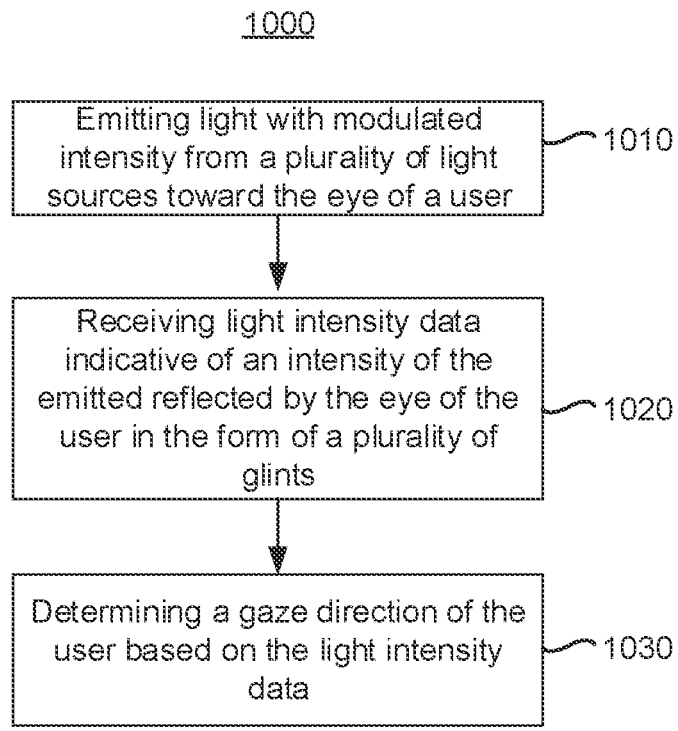
FIG. 10 is a flowchart representation of a method of determining a gaze direction using intensity-modulated glints in accordance with some implementations.

FIG. 10 is a flowchart representation of a method 1000 of determining an eye tracking characteristic using intensity-modulated light sources in accordance with some implementations. In some implementations (and as detailed below as an example), the method 1000 is performed by a head-mounted electronic device, such as the head-mounted electronic device 400 of FIG. 4. In various implementations, the method 1000 is performed by a device with one or more processors, non-transitory memory, and one or more AR/VR displays (e.g., the HMD 120 FIG. 3). In some implementations, the method 1000 is performed by processing logic, including hardware, firmware, software, or a combination thereof. In some implementations, the method 1000 is performed by a processor executing code stored in a non-transitory computer-readable medium (e.g., a memory).

The method 1000 begins, in block 1010, with the HMD emitting light with modulated intensity from a plurality of light sources toward an eye of a user. In various implementations, a first light source of the plurality of light sources is modulated at a first frequency with a first phase offset and a second light source of the plurality of light sources is modulated at the first frequency with a second phase offset different than the first phase offset. In various implementations, a first light source of the plurality of light sources is modulated at a first frequency and a second light source of the plurality of light sources is modulated at a second frequency different than the first frequency. In various implementations, a first light source of the plurality of light sources is modulated according to first orthogonal code and a second light source of the plurality of light sources is modulated according to second orthogonal code.

In various implementations, a first light source of the plurality of light sources is modulated within a first intensity range and a second light source of the plurality of light sources is modulated within a second intensity range different than the first intensity range. In various implementations, each light source of the plurality of light sources is modulated between a high intensity value and low intensity value. In various implementations, the high intensity value is an on state and the low intensity value is an off state. In various implementations, the number of light sources of the plurality of light sources in the on state is constant. In various implementations, the intensity is modulated according to at least one of a previously determined eye tracking characteristic, user biometrics, or a presented user interface.

In various implementations, the plurality of light sources emit light in a near-infrared wavelength range.

The method 1000 continues, at block 1020, with the HMD receiving light intensity data indicative of an intensity of the emitted light reflected by the eye of the user in the form of a plurality of glints. In various implementations, the light intensity data includes a plurality of images of the eye of the user. In various implementations, the light intensity data includes a plurality of event messages.

The method 1000 continues, at block 1030, with the HMD determining an eye tracking characteristic of the user based on the light intensity data. In various implementations, the eye tracking characteristic includes a gaze direction and/or a blinking state. In various implementations, the HMD filters the light intensity data according to a frequency range of the modulation and determines the eye tracking characteristic of the user based on the filtered light intensity data. In various implementations, the HMD identifies respective light sources based on modulation in the light intensity data and determines the eye tracking characteristic of the user based on the identification of the respective light sources.

Figure 11:
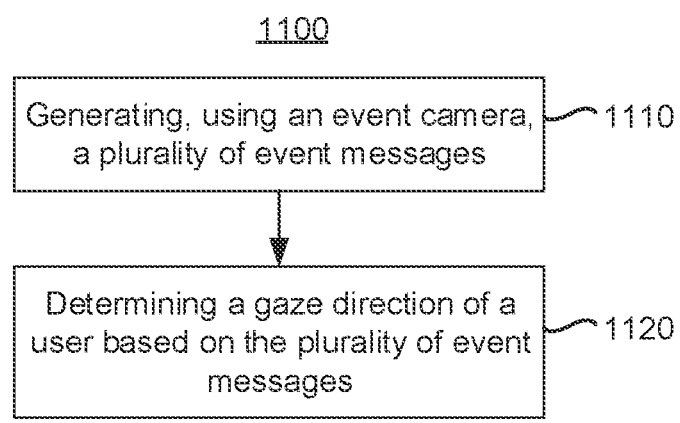
FIG. 11 is a flowchart representation of a method of determining a gaze direction using an event camera in accordance with some implementations.

FIG. 11 is a flowchart representation of a method 1100 of determining an eye tracking characteristic using an event camera in accordance with some implementations. In some implementations (and as detailed below as an example), the method 1100 is performed by a head-mounted electronic device, such as the head-mounted electronic device 400 of FIG. 4. In various implementations, the method 1100 is performed by a device with one or more processors, non-transitory memory, and one or more AR/VR displays (e.g., the HMD 120 FIG. 3). In some implementations, the method 1100 is performed by processing logic, including hardware, firmware, software, or a combination thereof. In some implementations, the method 1100 is performed by a processor executing code stored in a non-transitory computer-readable medium (e.g., a memory).

The method 1100 begins, in block 1110, with the HMD generating, using an event camera comprising a plurality of light sensors at a plurality of respective locations, a plurality of event messages. In various implementations, each of the plurality of event messages is generated in response to a particular light sensor detecting a change in intensity of light and each of the plurality of event messages indicates a particular location of the particular light sensor.

In various implementations, the particular location is indicated by a pixel coordinate. In various implementations, each of the plurality of event messages further indicates a polarity of the change in intensity of light. In various implementations, each of the plurality of event messages further indicates a time at which the change in intensity of light was detected.

The method 1100 continues, in block 1120, with the HMD determining an eye tracking characteristic of a user based on the plurality of event messages. In various implementations, the eye tracking characteristic includes a gaze direction and/or a blinking state.

In various implementations, the HMD determines the eye tracking characteristic by detecting a pupil of an eye of the user. For example, in various implementations, the HMD generates an approximate intensity image of the eye of the user based on the event messages from the event camera, locates a low-intensity region in the approximate intensity image of the eye of user, and fits an ellipse to the low-intensity region.

In various implementations, the HMD determines the eye tracking characteristic by tracking a pupil of an eye of the user. For example, in various implementations, the HMD locates one or more high-contrast edges based on the event messages from the event camera and fits a new ellipse based on the one or more high-contrast edges and a prior ellipse.

In various implementations, the HMD determines the eye tracking characteristic by detecting one or more glints reflected from an eye of the user (e.g., as performed in the method 1000 of FIG. 10). In various implementations, the HMD detects the one or more glints based on event messages that indicate an increase in intensity of light without being based on event messages that indicate a decrease in intensity of light. In various implementations, the HMD detects the one or more glints based on event messages that indicate a decrease in intensity of light without being based on event messages that indicate an increase in intensity of light.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
emitting light according to a modulation characteristic from one or more light sources towards an eye;
receiving, from an event camera, an event message in response to detecting a change in an intensity of the emitted light reflected by the eye; and
determining an eye tracking characteristic based on the event message and the modulation characteristic.

2. The method of claim 1, wherein the event message includes information regarding a corresponding one of the one or more of light sources.

3. The method of claim 2, wherein the event message indicates a respective location of the corresponding one of the one or more light sources.

4. The method of claim 2, wherein the event message indicates a change in intensity of the corresponding one of the one or more light sources.

5. The method of claim 4, wherein the event message further indicates a polarity of the change in the intensity.

6. The method of claim 4, wherein the event message further indicates a time at which the change in the intensity of light was detected.

7. The method of claim 1, wherein the event camera is different from a frame camera that generates one or more video frames, and wherein the event message does not include information regarding the one or more video frames.

8. The method of claim 1, wherein the modulation characteristic corresponds to a modulation intensity of the emitted light.

9. The method of claim 1, wherein the modulation characteristic corresponds to a modulation frequency of the emitted light.

10. The method of claim 1, wherein the modulation characteristic corresponds to a modulation phase of the emitted light.

11. The method of claim 1, wherein the event message includes light intensity data and wherein determining the eye tracking characteristic includes filtering the light intensity data according to the modulation characteristic.

12. The method of claim 11, wherein filtering the light intensity data includes filtering out light intensity data outside a frequency range of the modulation characteristic to generate target-frequency light intensity data, and filtering out light intensity data inside the frequency range of the modulation characteristic to generate off-target-frequency light intensity data.

13. The method of claim 1, wherein determining the eye tracking characteristic includes detecting a pupil of the eye.

14. The method of claim 13, wherein detecting the pupil of the eye includes:
generating an approximate intensity image of the eye based on the event message;
locating a low-intensity region in the approximate intensity image of the eye; and
fitting an ellipse to the low-intensity region.

15. The method of claim 14, wherein detecting the pupil of the eye includes:
locating one or more high-contrast edges based on the event message; and
fitting a new ellipse based on the one or more high-contrast edges and a prior ellipse.

16. The method of claim 1, wherein the eye tracking characteristic includes a gaze direction and/or a blinking state.

17. A system comprising:
one or more light sources to emit light according to a modulation characteristic towards an eye;
an event camera to generate an event message in response to detecting a change in an intensity of the emitted light reflected by the eye; and
a processer to determine an eye tracking characteristic based on the event message and the modulation characteristic.

18. The system of claim 17, wherein the event message includes information regarding a corresponding one of the one or more of light sources.

19. The system of claim 17, wherein the event camera is different from a frame camera that generates one or more video frames, and wherein the event message does not include information regarding the one or more video frames.

20. The system of claim 17, wherein the event message includes information regarding a corresponding one of the one or more of light sources.

21. A non-transitory computer-readable medium having instructions encoded thereon which, when executed by a processor, cause the processor to perform operations comprising:
emitting light according to a modulation characteristic from one or more light sources towards an eye;
receiving, from an event camera, an event message in response to detecting a change in an intensity of the emitted light reflected by the eye; and
determining an eye tracking characteristic based on the event message and the modulation characteristic.

22. The non-transitory computer-readable medium of claim 21, wherein the event message includes information regarding a corresponding one of the one or more of light sources.

23. The non-transitory computer-readable medium of claim 21, wherein the event camera is different from a frame camera that generates one or more video frames, and wherein the event message does not include information regarding the one or more video frames.

24. The non-transitory computer-readable medium of claim 21, wherein the modulation characteristic corresponds to a modulation intensity, a modulation frequency or a modulation phase of the emitted light.

* * * * *